United States Patent [19]
Nakamura

[11] Patent Number: 5,351,090
[45] Date of Patent: Sep. 27, 1994

[54] VIDEO AND AUDIO SIGNAL MULTIPLEXING APPARATUS AND SEPARATING APPARATUS

[75] Inventor: Kazuhiko Nakamura, Osaka, Japan

[73] Assignee: Matsushita Electric Industrial Co. Ltd., Osaka, Japan

[21] Appl. No.: 149,944

[22] Filed: Nov. 10, 1993

[30] Foreign Application Priority Data

Nov. 17, 1992 [JP] Japan .................................. 4-306706
Apr. 13, 1993 [JP] Japan .................................. 5-085948
Apr. 13, 1993 [JP] Japan .................................. 5-085949

[51] Int. Cl.$^5$ ................................................. H04N 7/08
[52] U.S. Cl. .................................... 348/484; 348/489; 348/515; 348/914
[58] Field of Search ............... 348/484, 489, 515, 914; H04N 7/08, 5/92, 5/91, 5/60

[56] References Cited

U.S. PATENT DOCUMENTS 5,113,242  5/1992  Tsinberg et al. .................... 348/489
5,231,492  7/1993  Dangi et al. ...................... 348/484 X
5,231,495  7/1993  Kaneko et al. .................... 348/484 X

FOREIGN PATENT DOCUMENTS 4-313979  11/1992  Japan ........................... H04N 5/91

*Primary Examiner*—Mark R. Powell
*Attorney, Agent, or Firm*—Wenderoth, Lind & Ponack

[57] ABSTRACT

When transmitting an audio signal by multiplexing in a synchronous period of a video signal, a buffer memory for time axis adjustment of the audio signal is controlled. The number of audio signal samples in the buffer memory is detected in every n fields (n being a positive integer) of video signal, and when it is different from a specific value, the read or write address of the buffer memory is preset, so that the number of audio signal samples in the buffer memory is kept constant at the moment of inspection in every n fields. Besides, by inspecting the number of audio signal samples in the buffer memory in one field or more, a line providing a maximum or minimum value of the number of samples is stored, and thereafter the number of audio signal samples in the buffer memory in that line is kept constant, so that the buffer memory capacity may be utilized effectively. As a method of recovering isochrony of the video and audio signals, at the transmission side, the delay time of the audio signal with respect to the video signal of a predetermined video line is kept constant, and, at the reception side, the video signal is delayed on the basis of the delay time of the audio signal with respect to the video signal in that line.

15 Claims, 4 Drawing Sheets

VIDEO AND AUDIO SIGNAL MULTIPLEXING APPARATUS AND SEPARATING APPARATUS

BACKGROUND OF THE INVENTION

1. Field of the Invention

The present invention relates to a systems for multiplexing and transmitting a digital audio signal and a digital video signal, and more particularly to a signal multiplexing apparatus for multiplexing a digital audio signal and a digital video signal, and a signal separating apparatus for separating the digital audio signal and the digital video signal from the transmitted multiplexed signal.

2. Description of the Prior Art

Recently, as the method for transmitting digital video signals in a broadcasting station, the serial transmission system of transmitting digital data in a serial form has come to be used progressively. This transmission system is standardized as SMPTE (Society of Motion Picture and Television Engineers) 259M Standard. In this standard, in the synchronizing signal portion of the digital video signal, other signal than the video signal can be multiplexed and transmitted, and as an example thereof, the digital audio signal is multiplexed.

In such transmission apparatus, an audio signal entered in one line of a video signal is multiplexed and transmitted in the horizontal synchronizing period of the next or subsequent video signal. A buffer RAM (random access memory) is required for time axis correction of the audio signal in each of the transmitter and receiver. Generally, no audio signal is multiplexed in the line for changing over the video signal or in the next line to prevent influences of the changeover on the audio signal. In particular, in the composite video signal, audio signal is not multiplexed in the line containing the equalizing pulse, and the audio signals to be transmitted in this period are multiplexed together in a vertical synchronizing period, so that a buffer RAM of a sufficiently large capacity is required.

A structural example of such buffer RAM is disclosed in Japanese Laid-open Patent Application No. 4-313979. In this known art, a memory of two ports is used for time axis correction of audio signal. The writing address is compared with a value obtained by adding a specified value to the reading address, and the reading address is controlled so that the reading address added with the specified value may not overrun the writing address.

In this method, it is guaranteed only that the writing address is ahead of the reading address by the specified value. The mean value of the differences between the writing address and reading address is guaranteed more than the specified value, but does not become just the specified value. Therefore, the delay of the audio signal with respect to the video signal is not constant, and it varies depending on the initial state of the transmitting apparatus or the line from which the input video signal begins to be inputted. Fluctuation of the delay time of the audio signal is disadvantageous when the timings of the video and audio signals are adjusted to be the same by delaying the video signal with respect to the audio signal before transmission or after transmission.

SUMMARY OF THE INVENTION

It is hence a primary object of the invention to present a video signal and audio signal multiplexing apparatus and separating apparatus capable of easily keeping the isochrony of a video signal and an audio signal by setting constant the delay time of the audio signal with respect to the video signal.

To achieve the above object, the invention provides a control of a buffer memory for time axis adjustment of an audio signal, in which the number of audio signal samples in the buffer memory is detected in every n fields (n being a positive integer) of a video signal, and a read address or a write address of the buffer memory is preset when the detected number of samples reaches a specified value, thereby keeping constant the number of audio signal samples in the buffer memory at the inspection point occurring at intervals of n fields.

Alternatively, the number of audio signal samples in the buffer memory is inspected in one field or more, a line having a maximum value or a minimum value of the detected number of samples is stored, and thereafter the number of audio signal samples in the buffer memory in the line is similarly kept at a specified value, so that capacity of the buffer memory may be utilized effectively.

On the other hand, as a method of recovering the isochrony of the video signal and audio signal, a delay time of the audio signal with respect to the video signal in a predetermined line of the video signal is kept constant at the transmission side, and the video signal is delayed at the reception side to recover the isochrony of the two signals on the basis of the delay time of the audio signal with respect to video signal in the same line.

DESCRIPTION OF THE PREFERRED EMBODIMENTS

Figure 1:
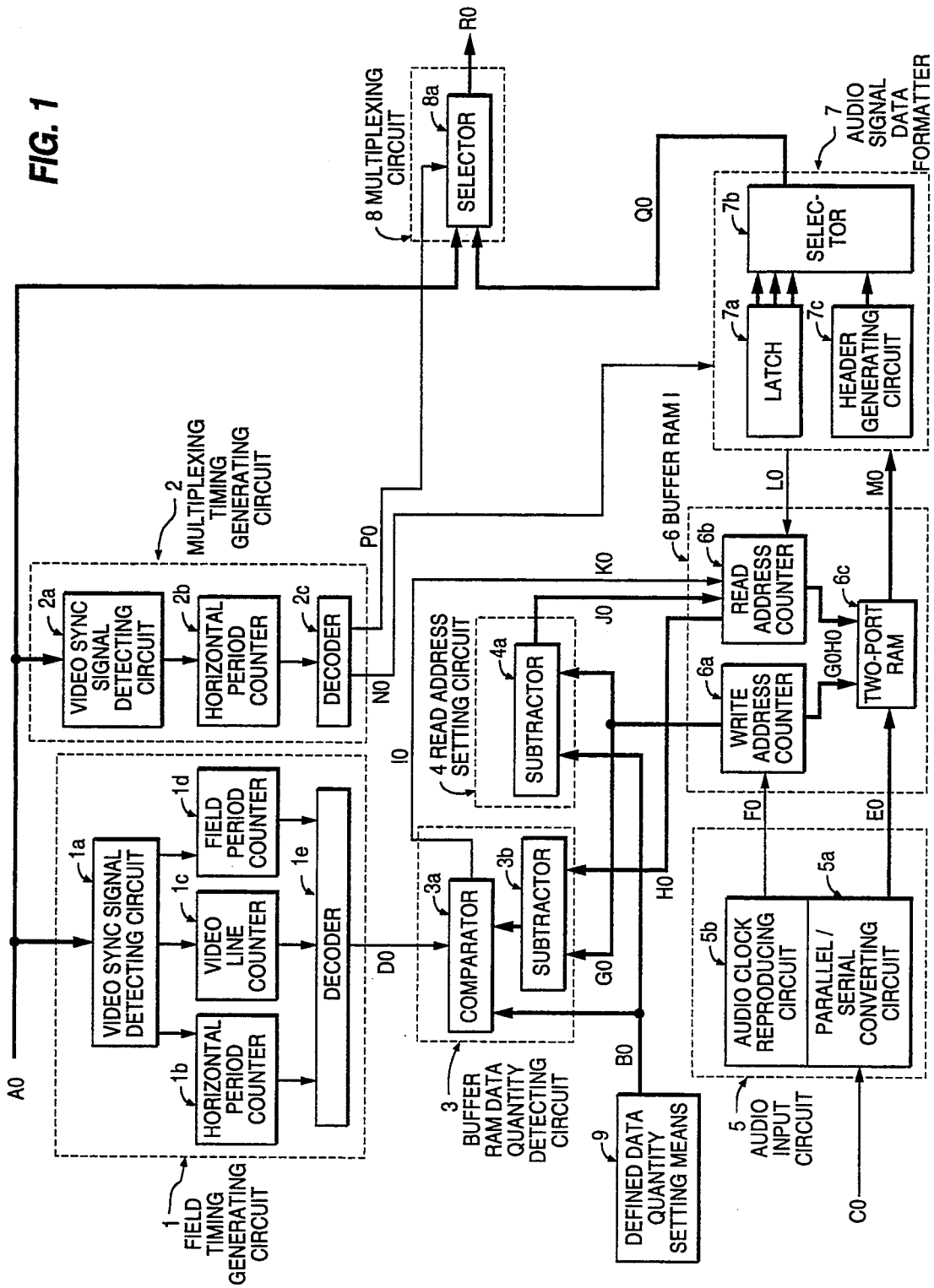
FIG. 1 is a block diagram showing an embodiment of a signal multiplexing apparatus of the invention.

An embodiment of a signal multiplexing apparatus of the invention is shown in FIG. 1. An input digital video signal A0 is supplied into a field timing generating circuit 1, a multiplexing timing generating circuit 2, and a multiplexing circuit 8. On the other hand, an input digital audio signal C0, which is generally serial, is converted into a parallel data E0 in an audio input circuit 5 comprising a serial/parallel converting circuit 5a and an audio clock reproducing circuit 5b, and is fed into a buffer RAM 6 together with a write clock F0. The buffer RAM 6 comprises a write address counter 6a, a read address counter 6b, and a memory 6c having two ports for read and write. The write address counter is incremented in response to the write clock F0, and the read address counter is incremented in response to a read clock L0.

The multiplexing timing generating circuit 2 comprises a video sync signal detecting circuit 2a, a horizontal period counter 2b, and a decoder 2c. The multiplexing timing generating circuit 2 detects the synchronizing period of the video signal for multiplexing the audio signal, and generates timing signals N0, P0 for multiplexing. By this timing signal N0, an audio signal data formatter 7 comprising a latch circuit 7a, a selector circuit 7b, and a header generating circuit 7c issues the read clock L0 to the buffer RAM 6 to read out an audio signal data M0, and issues the audio signal data M0 by converting it into a packet Q0 in a format to be multiplexed to the video signal. This packet Q0 is supplied to the multiplexing circuit 8. The multiplexing circuit 8, which comprises a selector circuit 8a, changes over the digital video signal A0 and the audio signal data packet Q0 in time division depending on the timing signal P0, and issues a multiplexed video signal R0.

On the other hand, in the field timing generating circuit 1, which comprises a video sync signal detecting circuit 1a, a horizontal period counter 1b, a video line counter 1c, a field period counter 1d, and a decoder 1e, detects the field period from the video signal A0, and generates one pulse in every n fields (n being a positive integer) as a field timing signal D0. Herein, n denotes the number of fields in which the number of samples of audio signal in this period is always a positive integer. When the video signal is NTSC and the sampling frequency of the audio signal is 48 kHz, the number of audio signal samples in a five-frame period of the video signal is 8008 samples, so that n=10 (or n=5) may be selected. In a buffer RAM data quantity inspecting circuit 3, at the timing of the frame timing signal D0, an address difference between a read address H0 from the read address counter 6b and a write address G0 from the write address counter 6a is determined in a subtractor 3b, and is compared in a comparator 3a with a specified value B0 set by a specified data quantity setting means 9. When the address difference is different from the specified value B0, a preset pulse K0 is issued to the read address counter 6b. Accordingly, a read address preset value J0 obtained by subtracting the specified value B0 from the write address G0 in a read address setting circuit 4 comprising a subtractor 4a is preset in the read address counter 6b. As a result, the effective audio signal data quantity in the buffer RAM becomes equal to a value corresponding to the specified value B0. As far as the audio signal is synchronized with the video signal, the audio signal data quantity in each of the subsequent inspection timings is kept constant. If a switching between video signal and audio signal should occur, presetting of the read address occurs at the inspection timing right after the switching, so that the audio signal data quantity in the buffer RAM is also equal to a value corresponding to the specified value in the subsequent inspection timings.

Incidentally, by setting the specified value B0 from outside of the apparatus, it is possible to control the delay time of the audio signal with respect to the video signal by making use of the buffer RAM 6.

Furthermore, by setting the inspection timing at the timing when the data quantity in the buffer RAM is expected to be minimum, underflow of the buffer RAM 6 can be prevented by setting the specified value B0 specified from outside to be larger than 0. Therefore, the delay time can be controlled while easily preventing underflow of the buffer RAM.

In this embodiment, an example of generating the field timing from video signal is shown, but the field timing may be generated from other signal accompanying the video signal, for example, the composite sync signal.

Figure 2:
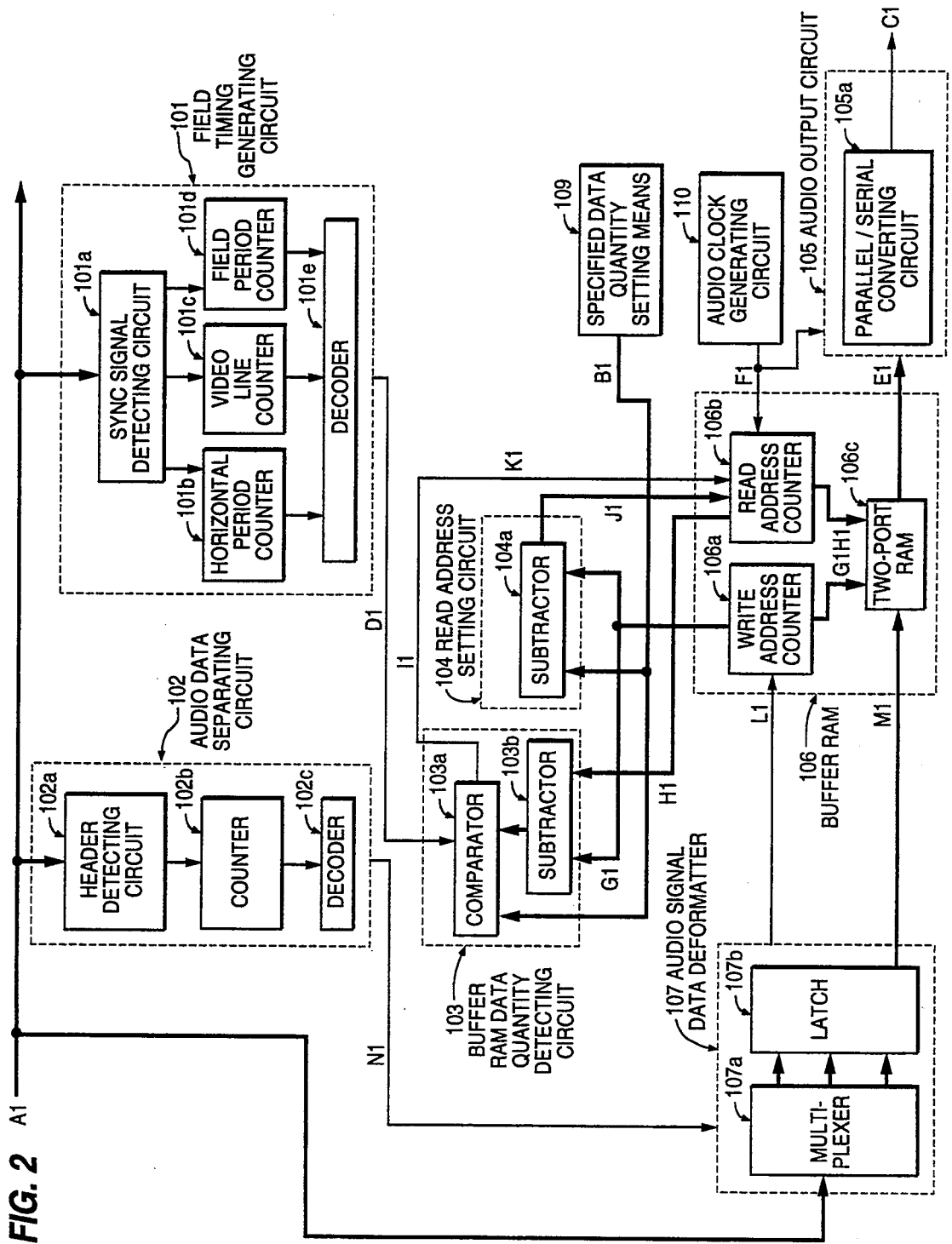
FIG. 2 is a block diagram showing an embodiment of a signal separating apparatus of the invention.

FIG. 2 shows an embodiment of a signal separating apparatus of the invention.

An audio-multiplexed digital video signal A1 is fed into an audio data separating circuit 102 and a field timing generating circuit 101. In the audio data separating circuit 102, from the information in a header part of a packet of audio data multiplexed on the video signal, a signal N1 indicating the audio data multiplexed period is generated, and an audio data is separated as a parallel data M1 by an audio signal data deformatter 107 comprising a multiplexer 107a and a latch circuit 107b. This parallel audio data M1 is fed into a buffer RAM 106 together with a write clock L1. The buffer RAM 106 comprises a write address counter 106a, a read address counter 106b, and a memory 106c having two ports for read and write. The write address counter 106a is incremented in response to the write clock L1, and the read address counter 106b is incremented in response to a read clock F1 generated by an audio clock generating circuit 110. In an audio output circuit 105, a parallel audio data E1 is read out from the buffer RAM 106 by the read clock F1, converted into a format of AES (Audio Engineering Society) or EBU (European Broadcasting Union), etc., and issued as a serial digital audio signal C1.

On the other hand, in the field timing generating circuit 101, the line, field, frame, etc. of the video signal are detected from the sync signal in the video signal, and one pulse is issued as a field timing signal D1, for example, in every audio frame period, that is, in every video field period in which the number of audio samples may be a positive integer. In a buffer RAM data quantity inspecting circuit 103, an address difference H1−G1 between a read address H1 from the read address counter 106b and a write address G1 from the write address counter 106a is calculated in a subtractor 103b, and is compared in a comparator 103a with a specified value B1 determined by a specified data quantity setting means 109. When the address difference H1−G1 at the timing of the field timing signal D1 is different from the specified value B1, a preset pulse K1 is issued to the read address counter 106b. Accordingly, a read address preset value J1 obtained by subtracting the specified value B1 from the write address G1 calculated in a read address setting circuit 104 is preset in the read address counter 106b. As a result, the effective audio signal data quantity in the buffer RAM 106 is equal to a specified data quantity corresponding to the specified value. As far as the audio signal is synchronized with the video signal, the audio signal data quantity is kept constant in the subsequent inspection timings. If a switching between video signal and audio signal occurs, presetting occurs to the read address at the inspection timing right after the switching, so that the audio signal data quantity the buffer RAM is kept equal to the specified data quantity in the subsequent inspection timings.

Figure 3:
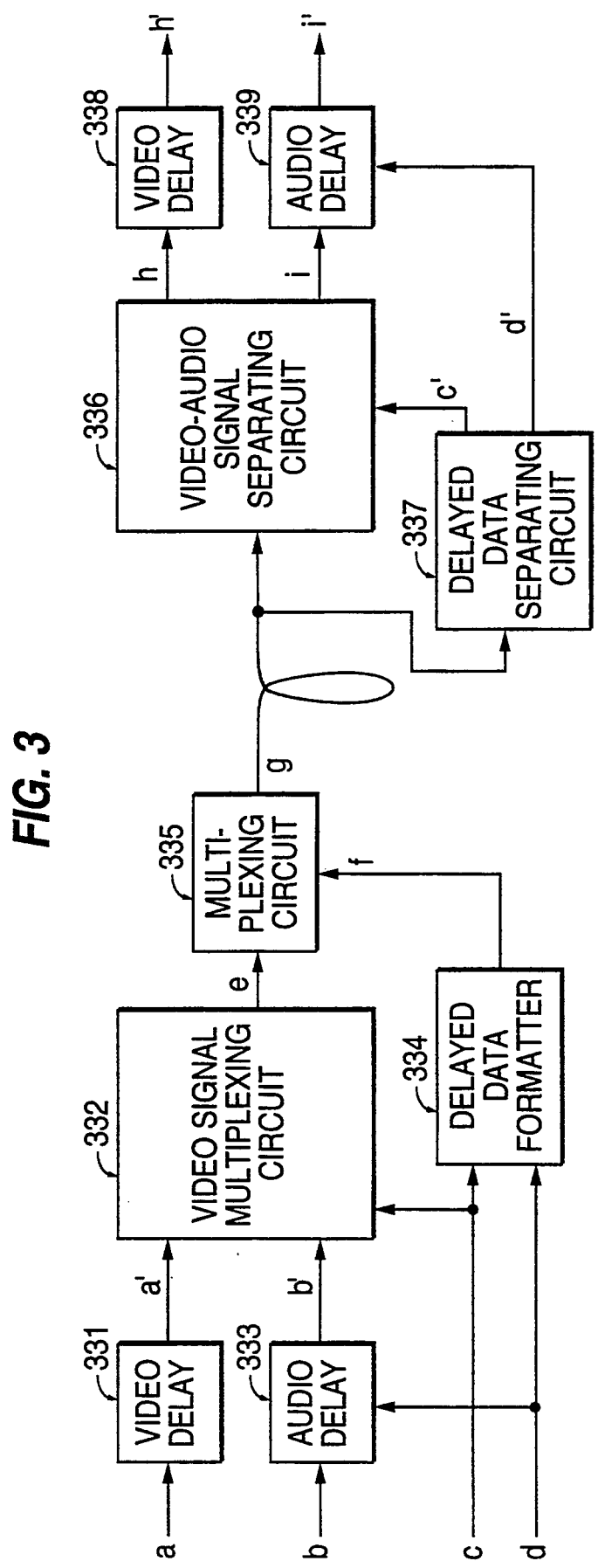
FIG. 3 is a block diagram showing an embodiment of application of the invention in both transmission and reception.

An embodiment of a transmission apparatus applying the invention in both transmission and reception side is shown in FIG. 3. At the transmission side, a video signal a passes through a video delay circuit 331 having a specific delay time, and enters a video-audio multiplexing circuit 332. On the other hand, an audio signal b passes through an audio delay circuit 333 capable of varying its delay time, and enters the video-audio multiplexing circuit 332 to be multiplexed on the video signal. A video line position data c for defining a delay time is fed into the video-audio multiplexing circuit 332. A specified delay time d is fed into the audio delay circuit 333 and video-audio multiplexing circuit 332. In the video-audio multiplexing circuit 332, for example, according to the method described with reference to FIG. 1, that is, by the method of keeping constant the audio data quantity in the buffer RAM in a video line specified by the video line position data c, while keeping the audio delay time in this line at a specific value, an audio signal b' is multiplexed on a video signal a'. In the audio delay circuit 333, the audio delay time is varied so that the delay time of the audio signal with respect to the video signal in the video line defined by the video line position data c of the transmission data g after multiplexing may be the specified delay time d. That is, the delay time of the audio delay circuit 332 is set so that the sum of the delay time by the video delay circuit 331 and the specified delay time d may be equal to the sum of the delay time by the audio delay circuit 332 and the delay time in the specific line by the video-audio multiplexing circuit. A delayed data formatter 334 converts the video line position data c and specified delay time d into such a format as to be multiplexed on the video signal, and the delayed data f is multiplexed on the video signal e by the delayed data multiplexing circuit 335 to be the transmission data g.

At the reception side, the transmission data g is fed into a video-audio separating circuit 336 to be separated into a video signal h and an audio signal i. The video signal h is issued as a video signal h' after being delayed for a specific time in a video delay circuit 338 having a specific delay time. From the transmission data g, moreover, a video line position data c' and a specified delay time d' are separated in a delayed data separating circuit 337. The video line position data c' enters the video-audio separating circuit 336, and the audio delay time with respect to the video signal at a line indicated by the video line position data c' is kept constant by the method explained with reference to FIG. 2. The specified delay time d' is fed into an audio delay circuit 339 capable of varying its delay time, and the delay time is set on the basis of this specified delay time d' so as to recover the isochrony of the video signal h' and the audio signal i'. That is, the delay time of the audio delay circuit 339 is set so that the sum of the specified delay time d', the delay time in the video line specified by the video line position data c' in the video-audio separating circuit 336, and the delay time in the audio delay circuit 339 may be equal to the delay time in the video delay circuit 338.

In this constitution, the isochrony of the video signal h' and audio signal i' can be securely recovered regardless of the manner of multiplexing the audio signal at the transmission side.

In the foregoing description, means for delaying the video signal is provided in each of the transmission side and reception side, but the delay of the video signal may be provided on either side only, or if the video signal is delayed from the audio signal in the case of, for example, prior reading of audio signal, the delay means may not be necessarily required. Incidentally, the audio delay circuit 332 may not be required, or a fixed-delay circuit may be usable. In this case, the specified delay time d may be varied accordingly.

The constitutions of the video-audio multiplexing circuit and video-audio separating circuit are described with reference to FIG. 1 and FIG. 2, but it is not limitative as far as the delay time in a specific line is constant. Furthermore, if the delay time in specific line is not constant, as far as the delay time in the specific line, that is, the audio data quantity in the buffer RAM, can be detected. the invention can be realized by varying the delay time of the audio delay circuit 339 by the detected delay time, that is, by setting the delay time of the audio delay circuit so that the delay by the delay time detected by the audio-video separating circuit, the transmitted specified delay time and the delay time of the audio delay circuit may be equal to the delay time of the video delay circuit.

Furthermore, by preliminarily specifying the specific video line position and the specified delay time at the transmission side and reception side, transmission of the video line position data c and the specified delay time d is not necessary, nor is necessary to vary the delay time of the audio delay circuit.

Figure 4:
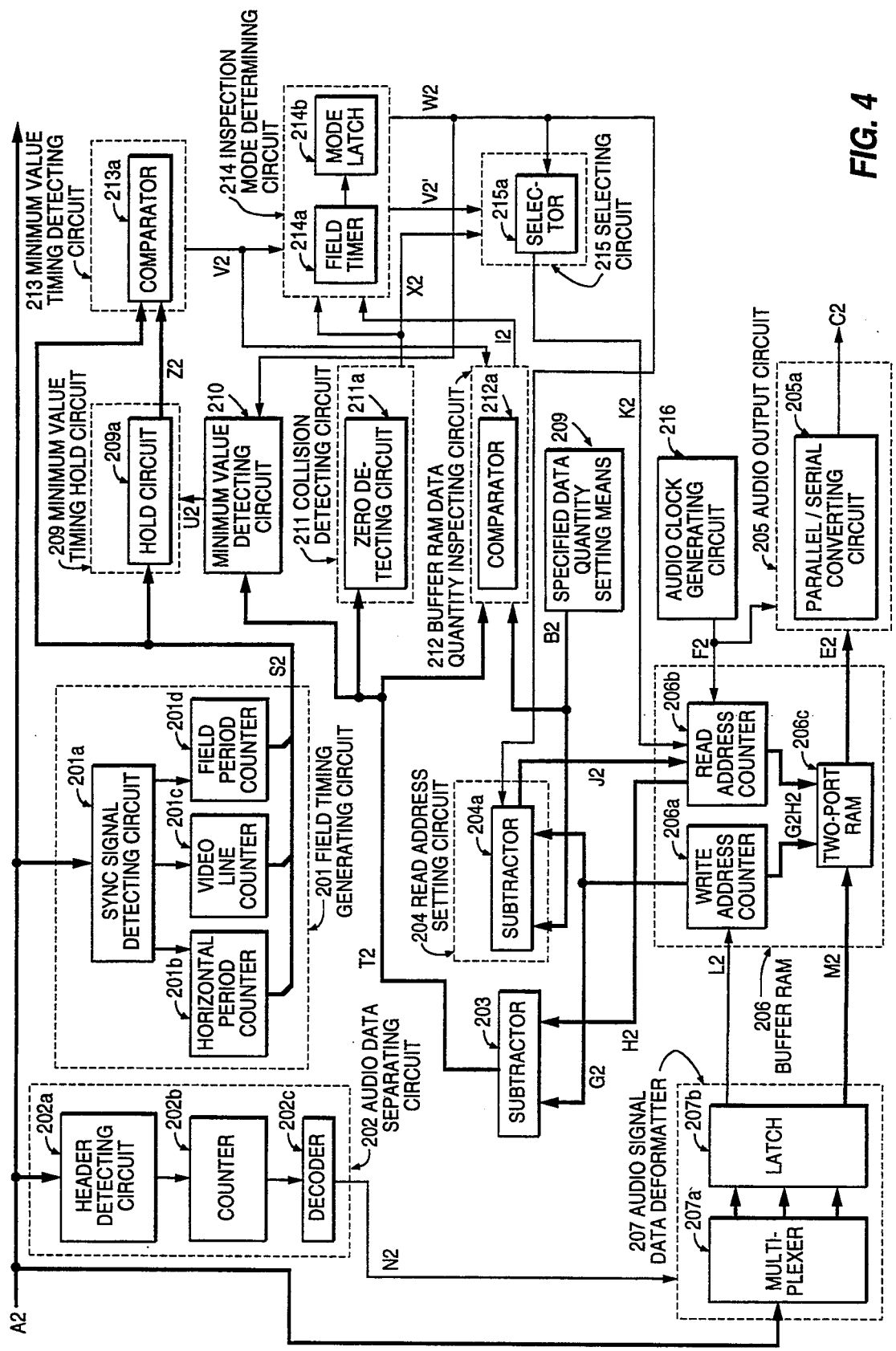
FIG. 4 is a block diagram showing another embodiment of a signal separating apparatus of the invention.

FIG. 4 shows another embodiment of a signal separating apparatus of the invention. An audio-multiplexed digital video signal A2 is fed into an audio data separating circuit 202 comprising a pattern matching header detecting circuit 202a, a counter 202b, and a decoder 202c, and a field timing generating circuit 201 comprising a sync signal detecting circuit 201a, a horizontal period counter 201b, a video line counter 201c, and a field period counter 201d. In the audio data separating circuit 202, a signal N2 showing the period in which the audio data is multiplexed is generated from the information in a header part of a packet of audio data multiplexed on the video signal, and the audio data is separated as a parallel data M2 by an audio signal data deformatter 207 comprising a multiplexer 207a and a latch circuit 207b. The parallel audio data M2 is fed into a buffer RAM 206 together with a write clock L2. The buffer RAM 206 comprises a write address counter 206a, a read address counter 206b, and a memory 206c having two ports for read and write. The write address counter 206a is counted up in response to the write clock L2, and the read address counter 206b is counted up in response to a read clock F2 generated in an audio clock generating circuit 216. An audio output circuit 205 reads out a parallel audio data E2 from the buffer RAM 206 by the read clock F2, converts the audio data E2 into a standard format of AES (Audio Engineering Society) or EBU (European Broadcasting Union), and issues a serial digital audio signal C2.

On the other hand, in the field timing generating circuit 201, the line, field, frame, and others of the video signal are detected from the sync signal in the video signal, and time position information such as line, field and frame of the video signal is detected and issued. In a subtractor 203, an address difference $T2 = H2 - G2$ of a read address H2 from the read address counter 206b and a write address G2 from the write address counter 206a is calculated.

Initially, it is supposed that an inspection mode signal W2 from an inspection mode determining circuit 214 comprising a field timer 214a and a mode latch 214b indicates a minimum value detection mode. In this mode, a minimum value detecting circuit 210 always detects a minimum value of the address difference T2. Every time the minimum value is updated, a time position hold signal U2 is issued to a minimum value timing hold circuit 209, and at this timing the time position of line, field, frame and others is held. In this mode, buffer RAM address collision, that is, whether the address difference T2 may be 0 or not, is detected by an address collision detecting circuit 211, and an address collision detection signal X2 is issued. A selector 215 selects the address collision detection signal X2 as a read address preset signal K2, and the read address setting circuit 204 issues a value right after the write address G2 as a preset data J2. Therefore, when detecting the address collision, the read address H2 is the value right after the write address G2. Accordingly, the minimum value detected by the minimum value detecting circuit 210 is updated to a proper value.

When absence of address collision over a specified period such as the audio frame period is detected by the field timer 214a, the mode latch 214b changes the inspection mode signal W2 to a stationary mode. In this mode, the fluctuation of the audio data quantity in the buffer RAM has been settled by the minimum value detection mode within the range of the buffer RAM capacity (that is, address collision does not occur), and the time position of the line, field, frame and others of the video signal in which the data quantity becomes the minimum value has been held in the minimum value timing hold circuit 209. Coincidence of a minimum value time position Z2 and present time position information S2 is detected by the minimum value timing detecting circuit 213, and a time position coincidence signal V2 is issued to the inspection mode determining circuit 214. The inspection mode determining circuit 214 issues only a first time position coincidence signal V2 after setting in the stationary mode to the selector 215 as V2'. In the stationary mode, the selector 215 issues this time position coincidence signal V2' as a preset pulse K2 of the read address counter 206b. The read address setting circuit 204 subtracts a specified value B2 from the write address G2, and issues a read address preset value J2. This read address preset value J2 is preset in the read address counter 206b. As a result, the effective audio signal data quantity in the buffer RAM 206 becomes equal to a specified data quantity corresponding to the specified value B2. Thereafter, in a buffer RAM data quantity inspecting circuit 212, at every timing of the time position coincidence signal V2, it is judged if the address difference T2 is matched with the specified value B2 from the specified data quantity setting means 209. As far as the audio signal is synchronized with the video signal, the audio signal data quantity in each of the subsequent time position coincidence timings is equal to the specified data quantity. If not coinciding, it is judged that a switching between the video signal and audio signal has took place, and a mismatching signal 12 is issued. If the mismatching signal 12 is issued, the inspection mode determining circuit 214 sets the inspection mode signal W2 in the minimum value detection mode again, and the minimum value is initially set in the minimum value detecting circuit 210, so that the same algorithm is repeated.

Accordingly, the operating point of the buffer RAM can be specified by the minimum value, and the capacity of the buffer RAM can be effectively utilized, so that the isochrony of picture and sound is recovered in a buffer RAM of small capacity.

In the embodiment, only the minimum value of the data quantity in the buffer RAM was determined, but it is also possible to control the buffer RAM by determining a maximum value of the data quantity, or both the maximum value and minimum value.

What is claimed is:

1. A signal multiplexing apparatus for multiplexing a digital audio signal on a digital video signal, comprising:
   a buffer memory for temporarily storing an input digital audio signal for time axis adjustment;
   means for generating a multiplexing timing signal by detecting a sync signal period of an input digital video signal;
   an audio signal formatter for packeting a digital audio signal outputted from the buffer memory into a packet in a format suited to multiplexing according to the multiplexing timing signal;
   a multiplexing circuit for multiplexing the packet on the input digital video signal according to the multiplexing timing signal to obtain a multiplexed digital video signal;
   means for generating a field timing in every n fields (n being a positive integer) of the video signal;
   audio data quantity detecting means for detecting the number of audio data samples in the buffer memory at the field timing; and
   address presetting means for presetting a read address or a write address of the buffer memory so as to keep constant the number of audio data samples in the buffer memory in every n fields when the detected number of audio data samples is out of a specified range or different from a specified value, whereby a time delay of the multiplexed audio signal with respect to the video signal is kept constant.

2. A signal multiplexing apparatus according to claim 1, further comprising means for varying the specified value so as to vary the delay time of the multiplexed audio signal with respect to the video signal.

3. A signal multiplexing apparatus according to claim 1, wherein the field timing generating means includes means for detecting a specific video line of the video signal, and detects the field timing signal in the specific video line, thereby keeping constant the delay time of the multiplexed audio signal with respect to the video signal in the specific video line.

4. A signal multiplexing apparatus according to claim 3, further comprising a delay circuit for delaying at least one of the input digital video signal and the input digital audio signal, and delay time setting means for setting a delay time of the delay circuit so as to keep constant the delay time of the multiplexed audio signal with respect to the video signal in the specific video line.

5. A signal multiplexing apparatus according to claim 4, wherein the delay time of the multiplexed audio signal with respect to the video signal in the specific video line is O.

6. A signal multiplexing apparatus according to claim 4, further comprising means for multiplexing on the video signal a data showing at least one of the specific video line and the delay time of the multiplexed audio signal with respect to the video signal in the specified video line.

7. A signal separating apparatus for separating a digital audio signal from an input multiplexed digital video signal on which a digital audio signal is multiplexed, comprising:
   means for generating a separation timing signal showing a multiplexed position of the digital audio signal from the input multiplexed digital video signal;
   means for separating the digital audio signal from the input multiplexed digital video signal according to the separation timing signal;
   a buffer memory for temporarily storing the separated digital audio signal for time axis adjustment;
   an audio clock generating circuit for generating an audio clock;

memory control means for reading the audio data from the buffer memory by the audio clock to obtain an output audio signal;

means for generating a field timing in every n fields (n being a positive integer);

audio data quantity detecting means for detecting the number of audio data samples in the buffer memory at the field timing; and address presetting means for presetting a read address or a write address of the buffer memory so as to keep constant the number of audio data samples in the buffer memory in every n fields when the detected number of audio data samples is out of a specified range or different from a specified value, whereby a time delay of the output audio signal with respect to the video signal is kept constant.

8. A signal separating apparatus according to claim 7, further comprising means for varying the specified value so as to vary the delay time of the output audio signal with respect to the video signal.

9. A signal separating apparatus according to claim 7, wherein the field timing generating means includes means for detecting a specific video line of the video signal, and issues the field timing signal in the specific video line, thereby keeping the delay time of the output audio signal with respect to the video signal constant in the specific video line.

10. A signal separating apparatus according to claim 9, further comprising a separating circuit for separating a data showing the specific video line multiplexed on the input multiplexed digital video signal, wherein the field timing generating means generates the field timing signal in the video line coinciding with the specific video line indicated by the detected data.

11. A signal separating apparatus according to claim 9, further comprising a delay circuit for delaying at least one of the digital video signal and the output digital audio signal, and means for setting a delay time of the delay circuit so as to recover isochrony of the output video signal and the output audio signal by compensating for a delay time accompanying multiplexing and separation of the output audio signal with respect to the video signal in the specific video line.

12. A signal separating apparatus according to claim 11, further comprising a separating circuit for separating a data showing a delay time of the multiplexed digital audio signal with respect to the digital video signal in the specific video line multiplexed on the input multiplexed digital video signal, wherein the delay time setting means sets the delay time of the delay circuit according to the delay time indicated by the data.

13. A signal separating apparatus for separating a digital audio signal from an input multiplexed digital video signal on which a digital audio signal is multiplexed, comprising:

means for generating a separation timing signal showing a multiplexed position of the digital audio signal from the input multiplexed digital video signal;

means for separating the digital audio signal from the input multiplexed digital video signal according to the separation timing signal;

a buffer memory for temporarily storing the separated digital audio signal for time axis adjustment;

an audio clock generating circuit for generating an audio clock;

memory control means for reading the audio data from the buffer memory by the audio clock to obtain an output audio signal;

audio data quantity detecting means for detecting the number of audio data samples in the buffer memory;

minimum value/maximum value detecting means for detecting at least one of a minimum value and a maximum value of the detected number of audio data samples; and address presetting means for setting a read address or a write address of the buffer memory so as to keep constant the minimum value or maximum value of the number of audio data samples in the buffer memory when the value detected by the minimum value/maximum value detecting means is out of a specified range or different from a specified value.

14. A signal separating apparatus according to claim 13, wherein the minimum value/maximum value detecting means detects the minimum value or maximum value of the number of audio data samples detected in a specified period, and a video signal line in which the minimum value or maximum value has occurred, wherein the address presetting means presets again the read address or write address of the buffer memory so that the number of audio data samples in the buffer memory at the video signal line may be the specified value at the end of the specific period, wherein said apparatus further comprises means for generating a timing signal showing the video line position at the end of the specific period, wherein the audio data quantity detecting means detects the number of audio data samples in the buffer memory at every timing signal showing the video signal line position, and wherein said apparatus further comprises a synchronous error detecting circuit for detecting as a synchronous error when the detected number of audio data samples is out of the specified range or different from the specified value.

15. A signal separating apparatus according to claim 14, further comprising means for controlling so as to start again from the detection of the minimum value or maximum value by the minimum value or maximum value detecting means for the specific period when a synchronous error is detected by the synchronous error detecting means.

* * * * *